(12) United States Patent
Jiao et al.

(10) Patent No.: US 11,663,446 B2
(45) Date of Patent: May 30, 2023

(54) DATA REUSE AND EFFICIENT PROCESSING SCHEME IN EXECUTING CONVOLUTIONAL NEURAL NETWORK

(71) Applicant: ALIBABA GROUP HOLDING LIMITED, Grand Cayman (KY)

(72) Inventors: Yang Jiao, San Mateo, CA (US); Long Chen, San Mateo, CA (US); Yi Jung Su, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 623 days.

(21) Appl. No.: 16/734,792

(22) Filed: Jan. 6, 2020

(65) Prior Publication Data
US 2021/0209442 A1 Jul. 8, 2021

(51) Int. Cl.
*G06N 3/04* (2023.01)
*G06N 3/10* (2006.01)

(52) U.S. Cl.
CPC .......... *G06N 3/04* (2013.01); *G06N 3/10* (2013.01)

(58) Field of Classification Search
CPC .................... G06N 3/04; G06N 3/10
See application file for complete search history.

(56) References Cited

U.S. PATENT DOCUMENTS

| 10,984,758 B1* | 4/2021 | Croxford | G09G 5/391 |
| 2020/0410036 A1* | 12/2020 | Huynh | G06F 17/153 |
| 2021/0158132 A1* | 5/2021 | Huynh | G06N 3/04 |
| 2021/0209442 A1* | 7/2021 | Jiao | G06N 3/04 |

OTHER PUBLICATIONS

Tu F, Yin S, Ouyang P, Tang S, Liu L, Wei S. Deep convolutional neural network architecture with reconfigurable computation patterns. IEEE Transactions on Very Large Scale Integration (VLSI) Systems. Apr. 12, 2017;25(8):2220-33. (Year: 2017).*
Peemen M, Setio AA, Mesman B, Corporaal H. Memory-centric accelerator design for convolutional neural networks. In2013 IEEE 31st International Conference on Computer Design (ICCD) Oct. 6, 2013 (pp. 13-19). IEEE. (Year: 2013).*

* cited by examiner

*Primary Examiner* — Chuen-Meei Gan
(74) *Attorney, Agent, or Firm* — Finnegan, Henderson, Farabow, Garrett & Dunner, LLP

(57) ABSTRACT

The present disclosure relates to a device for executing a convolutional neural network operation. The device comprises a first memory, a processing array comprising a plurality of processing strings, and a controller. The controller can be configured to fetch one or more batches of data into the first memory, regroup the one or more batches of data into multiple work items, wherein a first work item partially overlaps one or more work items among the multiple work items, and broadcast the multiple work items to the processing array, wherein the first work item is transferred to two or more processing strings of the processing array.

25 Claims, 11 Drawing Sheets

DATA REUSE AND EFFICIENT PROCESSING SCHEME IN EXECUTING CONVOLUTIONAL NEURAL NETWORK

BACKGROUND

Machine learning has been widely used in various areas. Convolutional neural network (CNN) is one type of a neural network widely applied on machine learning. CNNs are used in a variety of applications including image processing, speech recognition, game play, robotics, etc. Therefore, improving efficiency for processing CNNs is important to increase overall neural network execution performance.

SUMMARY OF THE DISCLOSURE

Embodiments of the present disclosure provide a device for executing a convolutional neural network operation. The device comprises a first memory, a processing array comprising a plurality of processing strings, and a controller. The controller can be configured to fetch one or more batches of data into the first memory, regroup the one or more batches of data into multiple work items, wherein a first work item partially overlaps one or more work items among the multiple work items, and broadcast the multiple work items to the processing array, wherein the first work item is transferred to two or more processing strings of the processing array.

Embodiments of the present disclosure also provide a method for executing a convolutional neural network operation. The method comprises fetching one or more batches of data in a first memory, regrouping the one or more batches of data into multiple work items, wherein a first work item partially overlaps one or more work items among the multiple work items, and broadcasting the multiple work items to a processing array comprising a plurality of processing strings, wherein the first work item is transferred to two or more processing strings of the processing array.

Embodiments of the present disclosure also provide a non-transitory computer readable storage medium storing a set of instructions that are executable by at least one processor of a computing device to cause the computing device to perform a method for executing a convolutional neural network operation. The method comprises fetching one or more batches of data in a first memory, regrouping the one or more batches of data into multiple work items, wherein a first work item partially overlaps one or more work items among the multiple work items, and broadcasting the multiple work items to a processing array comprising a plurality of processing strings, wherein the first work item is transferred to two or more processing strings of the processing array.

Embodiments of the present disclosure also provide a terminal comprising a host unit and a device for executing a convolutional neural network operation communicatively coupled to the host unit. The device comprises a first memory, a processing array comprising a plurality of processing strings, and a controller. The controller can be configured to fetch one or more batches of data into the first memory, regroup the one or more batches of data into multiple work items, wherein a first work item partially overlaps one or more work items among the multiple work items, and broadcast the multiple work items to the processing array, wherein the first work item is transferred to two or more processing strings of the processing array.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

FIG. 5 illustrates an example of input data to be used for a CNN operation.

FIG. 6B illustrates an example of data fetch and assembly in a second time period, consistent with embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
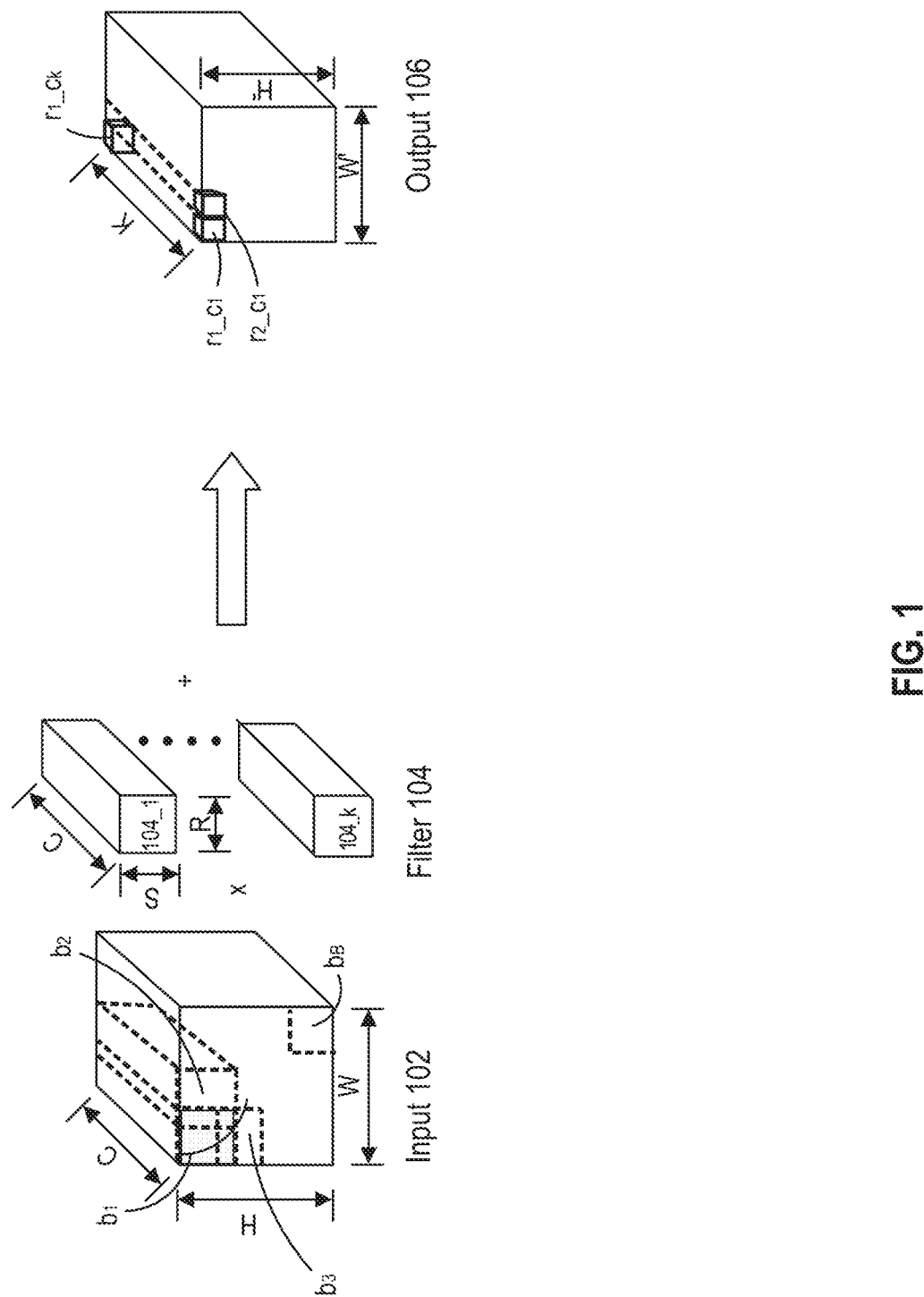
FIG. 1 illustrates an exemplary convolutional neural network (CNN) operation.

FIG. 1 illustrates an exemplary convolutional neural network (CNN) operation. In this exemplary operation, input data 102 such as activations are structured as a set of two-dimensional (2D) feature maps across a number (e.g., C) of channels. Each of the two-dimensional feature maps can be referred to as a channel. As shown in FIG. 1, input data 102 (e.g., an image) has C number of feature maps, and one channel of input data 102 has a size of H×W. Therefore, the size of the input data 102 can be H×W×C.

In FIG. 1, input data 102 can be convolved with a filter 104. Different feature maps of input data 102 may have different parameters such as weights, bias terms, etc. while one feature map can share the same parameters. Therefore, each filter 104 can have C number of channels corresponding to C number of feature maps of input data 102. Each channel of filter 104 can slide over a corresponding feature map of input data 102. As shown in FIG. 1, each channel of filter 104 has a size S×R, and the size of one filter 104 can be S×R×C. Here, a window sliding over input data 102 for a convolution operation can have the size S×R. In this example, input data 102 is convolved with K number of filters 104_1 to 104_k.

When a first channel of a first filter 104_1 slides on a first feature map of input data 102 for a convolution operation, the first channel of first filter 104_1 is multiplied to receptive fields such as $b_1$ to $b_3$ in the first feature map of input data 102. Receptive fields $b_1$ to $b_3$ can be defined to partially overlap with adjacent receptive fields. For example, first receptive field $b_1$ partially overlaps with second receptive field $b_2$ and third receptive field $b_3$ as shown in FIG. 1. Receptive fields for the rest of feature maps of input data 102 can be defined corresponding to receptive fields of the first feature map. Therefore, each of first receptive field $b_1$ to third receptive field $b_3$ has C number of channels. When each feature map of input data 102 has B number of receptive fields, it can be considered that, in the present disclosure, the input data 102 comprises B number of work items each of which includes C number of channels for illustration purposes. Here, C channels of each work item can have a size corresponding to a size S×R of the receptive field.

One output value can be generated by multiplying first filter 104_1 with first receptive field $b_1$ of input data 102 and by summing multiplication results for C number of channels. For example, first output value $r_1\_c_1$ can be generated by multiplying each channel of first filter 104_1 and corresponding feature map in the first receptive field $b_1$ of input data 102 and by summing multiplication results from C number of channels. By multiplying first filter 104_1 and second receptive field $b_2$ of input data 102 channel by channel and by summing multiplication results for C number of channels, second output value $r_2\_c_1$ can be generated. B number of output values including first output value $r_1\_c_1$ and second output value $r_1\_c_2$ generated by sliding first filter 104_1 over input data 102 can constitute a first channel of output data 106.

Similarly, B number of output values can be generated by convolving second filter 104_2 on input data 102 and can constitute a second channel of output data 106. B number of output values can also be generated by convolving $K^{th}$ filter 104_k on input data 102 and can constitute a $K^{th}$ channel of output data 106. For example, first output value $r_1\_c_k$ on the $K^{th}$ channel can be generated by multiplying each channel of $K^{th}$ filter 104_1 and corresponding feature map in the first receptive field $b_1$ of input data 102 and by summing multiplication results for C number of channels. As shown in FIG. 1, output data 106 can have K number of channels corresponding to the number of filters 104 and each channel has a size of H'×W'. Therefore, the size of the output data 106 can be H'×W'×K. In this example, H'×W' can be equal to the number of work items of input data 102, i.e., B. In some embodiments, output data 106 can be intermediate output data of a convolutional operation. In some embodiments, output data 106 can be further processed by other operations including element-wise operations to generate final output data for the convolutional operation.

When executing a convolution operation, data for each receptive field such as $b_1$ to $b_3$ of input data 102 are fetched from on-chip or off-chip memory to a buffer memory for computation. As known from above, receptive fields $b_1$ to $b_3$ partially overlap with each other. Overlapped data among receptive fields $b_1$ to $b_3$ are conventionally fetched from on-chip memory or off-chip memory and stored to the buffer memory multiple times for a convolution operation, which causes buffer space deficiency or data transfer delay. Therefore, data reuse or share schemes for overlapped data among receptive fields $b_1$ to $b_3$ can be beneficial for improving overall system throughput by reducing data stored in the buffer or by minimizing data transfer bandwidth usage. Embodiments of the present disclosure can provide an accelerator enabling efficient processing of CNN operations. Embodiments of the present disclosure can also provide data reuse or share scheme suitable for executing CNN operations.

Figure 2A:
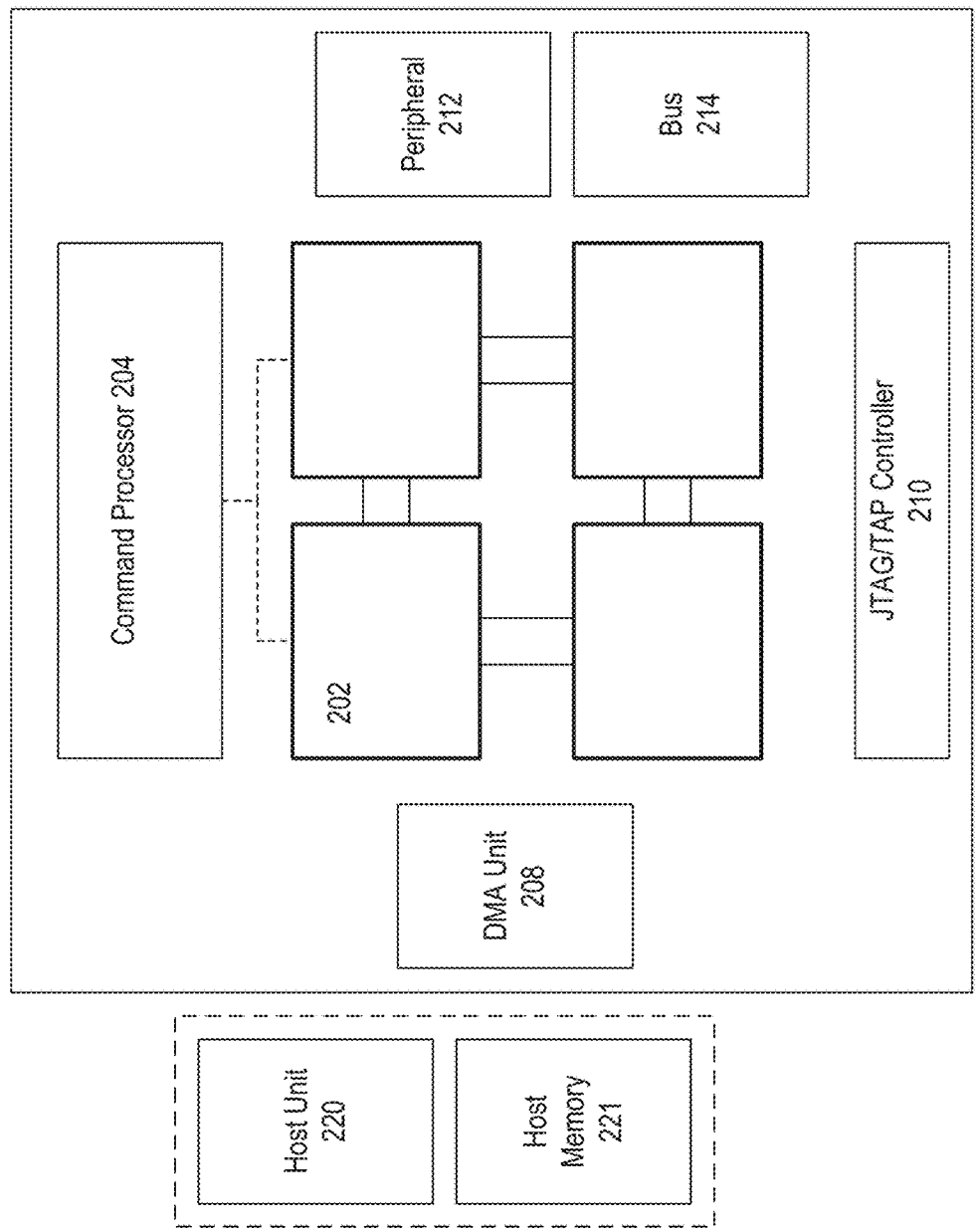
FIG. 2A illustrates an exemplary neural network accelerator architecture, consistent with embodiments of the present disclosure.

FIG. 2A illustrates an exemplary neural network accelerator architecture, consistent with embodiments of the present disclosure. In the context of this disclosure, a neural network accelerator may also be referred to as a machine learning accelerator or deep learning accelerator. In some embodiments, accelerator architecture 200 may be referred to as a neural network processing unit (NPU) architecture 200. As shown in FIG. 2A, accelerator architecture 200 can include a plurality of cores 202, a command processor 204, a direct memory access (DMA) unit 208, a Joint Test Action Group (JTAG)/Test Access End (TAP) controller 210, a peripheral interface 212, a bus 214, and the like.

It is appreciated that, cores 202 can perform algorithmic operations based on communicated data. Cores 202 can include one or more processing elements that may include single instruction, multiple data (SIMD) architecture including one or more processing units configured to perform one or more operations (e.g., multiplication, addition, multiply-accumulate, etc.) based on commands received from command processor 204. To perform the operation on the communicated data packets, cores 202 can include one or more processing elements for processing information in the data packets. Each processing element may comprise any number of processing units. According to some embodiments of the present disclosure, accelerator architecture 200 may include a plurality of cores 202, e.g., four cores. In some embodiments, the plurality of cores 202 can be communicatively coupled with each other. For example, the plurality of cores 202 can be connected with a single directional ring bus, which supports efficient pipelining for large neural network models. The architecture of cores 202 will be explained in detail with respect to FIG. 2B.

Command processor 204 can interact with a host unit 220 and pass pertinent commands and data to corresponding core 202. In some embodiments, command processor 204 can interact with host unit under the supervision of kernel mode driver (KMD). In some embodiments, command processor 204 can modify the pertinent commands to each core 202, so that cores 202 can work in parallel as much as possible. The modified commands can be stored in an instruction buffer. In some embodiments, command processor 204 can be configured to coordinate one or more cores 202 for parallel execution.

DMA unit 208 can assist with transferring data between host memory 221 and accelerator architecture 200. For example, DMA unit 208 can assist with loading data or instructions from host memory 221 into local memory of cores 202. DMA unit 208 can also assist with transferring data between multiple accelerators. DMA unit 208 can allow off-chip devices to access both on-chip and off-chip memory without causing a host CPU interrupt. In addition, DMA unit 208 can assist with transferring data between components of accelerator architecture 200. For example, DMA unit 208 can assist with transferring data between multiple cores 202 or within each core. Thus, DMA unit 208 can also generate memory addresses and initiate memory read or write cycles. DMA unit 208 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst. It is appreciated that accelerator architecture 200 can include a second DMA unit, which can be used to transfer data between other accelerator architectures to allow multiple accelerator architectures to communicate directly without involving the host CPU.

JTAG/TAP controller 210 can specify a dedicated debug port implementing a serial communications interface (e.g., a JTAG interface) for low-overhead access to the accelerator without requiring direct external access to the system address and data buses. JTAG/TAP controller 210 can also have on-chip test access interface (e.g., a TAP interface) that implements a protocol to access a set of test registers that present chip logic levels and device capabilities of various parts.

Peripheral interface 212 (such as a PCIe interface), if present, serves as an (and typically the) inter-chip bus, providing communication between the accelerator and other devices.

Bus 214 (such as a I$^2$C bus) includes both intra-chip bus and inter-chip buses. The intra-chip bus connects all internal components to one another as called for by the system architecture. While not all components are connected to every other component, all components do have some connection to other components they need to communicate with. The inter-chip bus connects the accelerator with other devices, such as the off-chip memory or peripherals. For example, bus 214 can provide high speed communication across cores and can also connect cores 202 with other units, such as the off-chip memory or peripherals. Typically, if there is a peripheral interface 212 (e.g., the inter-chip bus), bus 214 is solely concerned with intra-chip buses, though in some implementations it could still be concerned with specialized inter-bus communications.

Accelerator architecture 200 can also communicate with a host unit 220. Host unit 220 can be one or more processing unit (e.g., an X86 central processing unit). As shown in FIG. 2A, host unit 220 may be associated with host memory 221. In some embodiments, host memory 221 may be an integral memory or an external memory associated with host unit 220. In some embodiments, host memory 221 may comprise a host disk, which is an external memory configured to provide additional memory for host unit 220. Host memory 221 can be a double data rate synchronous dynamic random-access memory (e.g., DDR SDRAM) or the like. Host memory 221 can be configured to store a large amount of data with slower access speed, compared to the on-chip memory integrated within accelerator chip, acting as a higher-level cache. The data stored in host memory 221 may be transferred to accelerator architecture 200 to be used for executing neural network models.

In some embodiments, a host system having host unit 220 and host memory 221 can comprise a compiler (not shown). The compiler is a program or computer software that transforms computer codes written in one programming language into instructions for accelerator architecture 200 to create an executable program. In machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can compile a neural network to generate static parameters, e.g., connections among neurons and weights of the neurons.

In some embodiments, host system including the compiler may push one or more commands to accelerator architecture 200. As discussed above, these commands can be further processed by command processor 204 of accelerator architecture 200, temporarily stored in an instruction buffer of accelerator architecture 200, and distributed to corresponding one or more cores (e.g., cores 202 in FIG. 2A) or processing elements. Some of the commands may instruct a DMA unit (e.g., DMA unit 208 of FIG. 2A) to load instructions and data from host memory (e.g., host memory 221 of FIG. 2A) into accelerator architecture 200. The loaded instructions may then be distributed to each core (e.g., core 202 of FIG. 2A) assigned with the corresponding task, and the one or more cores may process these instructions.

Figure 2B:
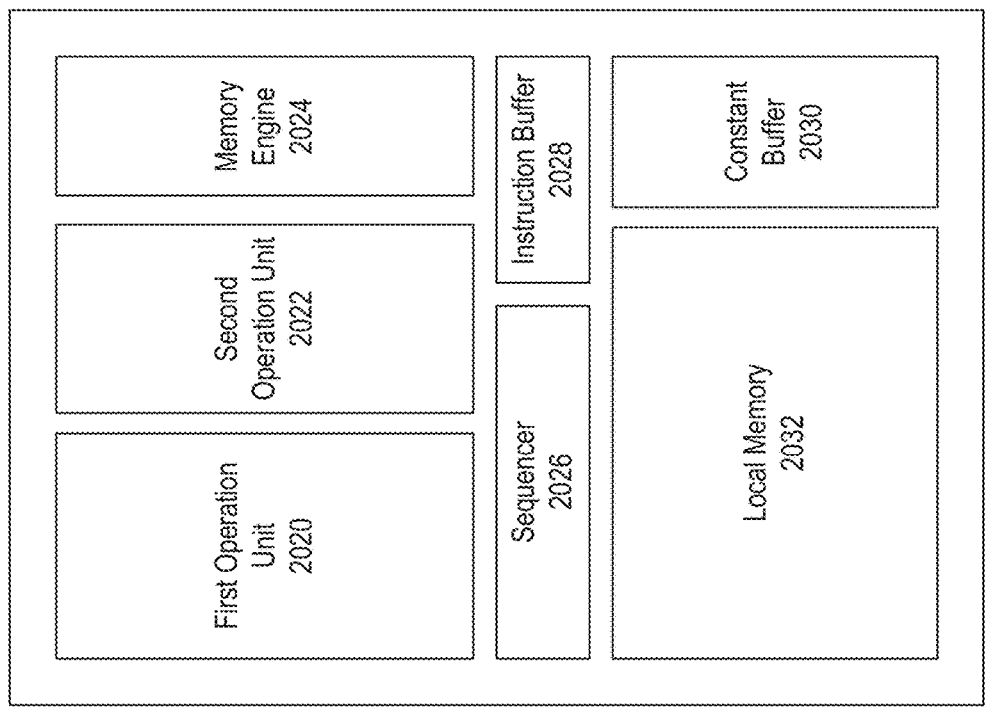
FIG. 2B illustrates an exemplary neural network accelerator core architecture, consistent with embodiments of the present disclosure.

It is appreciated that the first few instructions received by the cores 202 may instruct the cores 202 to load/store data from host memory 221 into one or more local memories of the cores (e.g., local memory 2032 of FIG. 2B). Each core 202 may then initiate the instruction pipeline, which involves fetching the instruction (e.g., via a sequencer) from the instruction buffer, decoding the instruction (e.g., via a DMA unit 208 of FIG. 2A), generating local memory addresses (e.g., corresponding to an operand), reading the source data, executing or loading/storing operations, and then writing back results.

According to some embodiments, accelerator architecture 200 can further include a global memory (not shown) having memory blocks (e.g., 4 blocks of 8 GB second generation of high bandwidth memory (HBM2)) to serve as main memory. In some embodiments, the global memory can store instructions and data from host memory 221 via DMA unit 208. The instructions can then be distributed to an instruction buffer of each core assigned with the corresponding task, and the core can process these instructions accordingly.

In some embodiments, accelerator architecture 200 can further include memory controller (not shown) configured to manage reading and writing of data to and from a specific memory block (e.g., HBM2) within global memory. For example, memory controller can manage read/write data coming from core of another accelerator (e.g., from DMA unit 208 or a DMA unit corresponding to another accelerator) or from core 202 (e.g., from a local memory in core 202). It is appreciated that more than one memory controller can be provided in accelerator architecture 200. For example, there can be one memory controller for each memory block (e.g., HBM2) within global memory.

Memory controller can generate memory addresses and initiate memory read or write cycles. Memory controller can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

While accelerator architecture 200 of FIG. 2A can be used for convolutional neural networks (CNNs) in some embodiments of the present disclosure, it is appreciated that accelerator architecture 200 of FIG. 2A can be utilized in various neural networks, such as deep neural networks (DNNs), recurrent neural networks (RNNs), or the like. In addition, some embodiments can be configured for various processing architectures, such as neural network processing units (NPUs), graphics processing units (GPUs), field programmable gate arrays (FPGAs), tensor processing units (TPUs), application-specific integrated circuits (ASICs), any other types of heterogeneous accelerator processing units (HAPUs), or the like FIG. 2B illustrates an exemplary core architecture, consistent with embodiments of the present disclosure. As shown in FIG. 2B, core 202 can include one or more operation units such as first and second operation units 2020 and 2022, a memory engine 2024, a sequencer 2026, an instruction buffer 2028, a constant buffer 2030, a local memory 2032, or the like.

One or more operation units can include first operation unit 2020 and second operation unit 2022. First operation unit 2020 can be configured to perform operations on received data (e.g., matrices). In some embodiments, first operation unit 2020 can include one or more processing units configured to perform one or more operations (e.g., multiplication, addition, multiply-accumulate, element-wise operation, etc.). In some embodiments, first operation unit 2020 is configured to accelerate execution of convolution operations or matrix multiplication operations. An example of first operation unit 2020 will be explained with respect to FIG. 3 in detail.

Second operation unit 2022 can be configured to perform a pooling operation, an interpolation operation, a region-of-interest (ROI) operation, and the like. In some embodiments, second operation unit 2022 can include an interpolation unit, a pooling data path, and the like.

Memory engine 2024 can be configured to perform a data copy within a corresponding core 202 or between two cores. DMA unit 208 can assist with copying data within a corresponding core or between two cores. For example, DMA unit 208 can support memory engine 2024 to perform data copy from a local memory (e.g., local memory 2032 of FIG. 2B) into a corresponding operation unit. Memory engine 2024 can also be configured to perform matrix transposition to make the matrix suitable to be used in the operation unit.

Sequencer 2026 can be coupled with instruction buffer 2028 and configured to retrieve commands and distribute the commands to components of core 202. For example, sequencer 2026 can distribute convolution commands or multiplication commands to first operation unit 2020, distribute pooling commands to second operation unit 2022, or distribute data copy commands to memory engine 2024. Sequencer 2026 can also be configured to monitor execution of a neural network task and parallelize sub-tasks of the neural network task to improve efficiency of the execution. In some embodiments, first operation unit 2020, second operation unit 2022, and memory engine 2024 can run in parallel under control of sequencer 2026 according to instructions stored in instruction buffer 2028.

Instruction buffer 2028 can be configured to store instructions belonging to the corresponding core 202. In some embodiments, instruction buffer 2028 is coupled with sequencer 2026 and provides instructions to the sequencer 2026. In some embodiments, instructions stored in instruction buffer 2028 can be transferred or modified by command processor 204.

Constant buffer 2030 can be configured to store constant values. In some embodiments, constant values stored in constant buffer 2030 can be used by operation units such as first operation unit 2020 or second operation unit 2022 for batch normalization, quantization, de-quantization, or the like.

Local memory 2032 can provide storage space with fast read/write speed. To reduce possible interaction with a global memory, storage space of local memory 2032 can be implemented with large capacity. With the massive storage space, most of data access can be performed within core 202 with reduced latency caused by data access. In some embodiments, to minimize data loading latency and energy consumption, SRAM (static random access memory) integrated on chip can be used as local memory 2032. In some embodiments, local memory 2032 can have a capacity of 192 MB or above. According to some embodiments of the present disclosure, local memory 2032 be evenly distributed on chip to relieve dense wiring and heating issues.

Figure 2C:
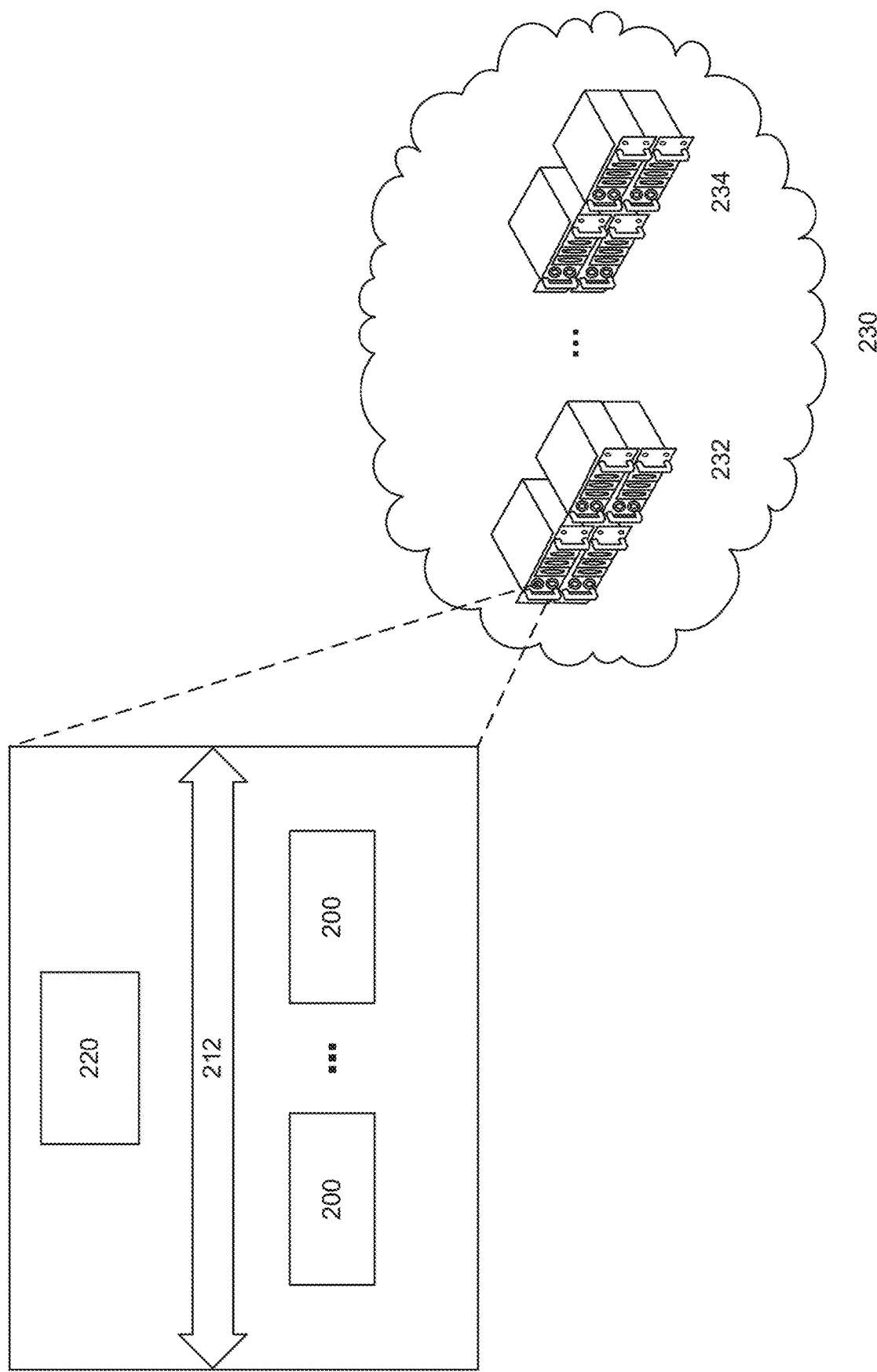
FIG. 2C illustrates a schematic diagram of an exemplary cloud system incorporating a neural network accelerator, consistent with embodiments of the present disclosure.

FIG. 2C illustrates a schematic diagram of an exemplary cloud system incorporating accelerator architecture 200, consistent with embodiments of the present disclosure. As shown in FIG. 2C, cloud system 230 can provide a cloud service with artificial intelligence (AI) capabilities and can include a plurality of computing servers (e.g., 232 and 234). In some embodiments, a computing server 232 can, for example, incorporate a neural network accelerator architecture 200 of FIG. 2A. Neural network accelerator architecture 200 is shown in FIG. 2C in a simplified manner for simplicity and clarity.

With the assistance of neural network accelerator architecture 200, cloud system 230 can provide the extended AI capabilities of image recognition, facial recognition, translations, 3D modeling, and the like. It is appreciated that, neural network accelerator architecture 200 can be deployed to computing devices in other forms. For example, neural network accelerator architecture 200 can also be integrated in a computing device, such as a smart phone, a tablet, and a wearable device.

Figure 3:
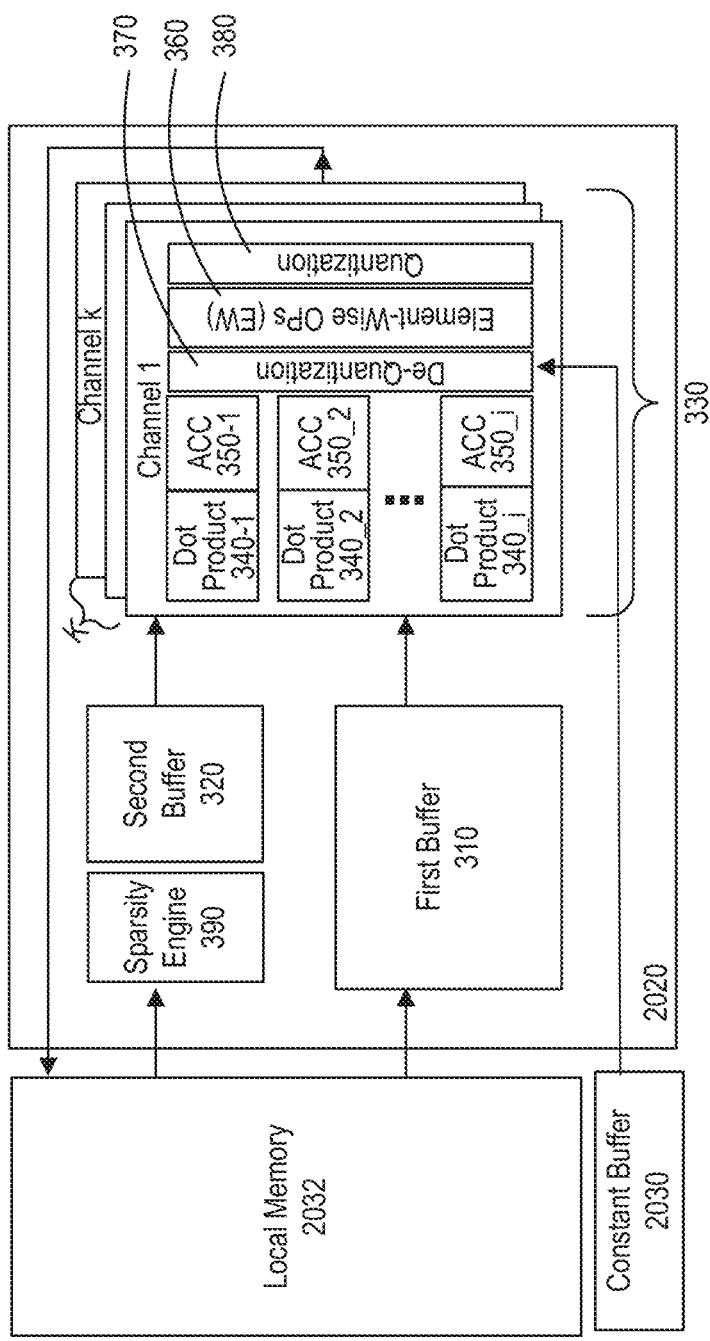
FIG. 3 illustrates an exemplary operation unit configuration, consistent with embodiments of the present disclosure.

FIG. 3 illustrates an exemplary operation unit configuration, consistent with embodiments of the present disclosure. According to embodiments of the present disclosure, operation unit can be first operation unit (e.g., first operation unit 2020 in FIG. 2). Operation unit 2020 may include a first buffer 310, a second buffer 320, and a processing array 330.

First buffer 310 may be configured to store input data (e.g., input data 102 in FIG. 1). In some embodiments, data stored in first buffer 310 can be input data to be used in processing array 330 for execution. In some embodiments, the input data can be fetched from local memory (e.g., local memory 2032 in FIG. 2B). First buffer 310 may be configured to support reuse or share of data to be used in processing array 330. In some embodiments, input data stored in first buffer 310 may be activation data for a convolution operation. An exemplary data reuse or share scheme for first buffer 310 will be explained in detail with respect to FIG. 6A to FIG. 6C.

Second buffer 320 may be configured to store weight data (e.g., weight data 104 in FIG. 1). In some embodiments, weight data stored in second buffer 320 can be used in processing array 330 for execution. In some embodiments, the weight data stored in second buffer 320 can be fetched from local memory (e.g., local memory 2032 in FIG. 2B). In some embodiments, weight data stored in second buffer 320 may be filter data (e.g., filter 104 in FIG. 1) for a convolution operation.

According to some embodiments of the present disclosure, weight data stored in second buffer 320 can be compressed data. For example, weight data can be pruned data to save memory space on chip. In some embodiments, operation unit 2020 can further include a sparsity engine 390. Sparsity engine 390 can be configured to unzip compressed weight data to be used in processing array 330.

Processing array 330 may have a plurality of layers (e.g., corresponding to K number of filters 104 in FIG. 1). According to embodiments of the present disclosure, each layer of processing array 330 may include a plurality of processing strings, which may perform computations in parallel. For example, first processing string included in the first layer of processing array 330 can comprise a first multiplier 340_1 and a first accumulator 350_1 and second processing string can comprise a second multiplier 340_2 and a second accumulator 350_2. Similarly, $i^{th}$ processing string in the first layer can comprise an $i^{th}$ multiplier 340_i and an $i^{th}$ accumulator 350_i. While computations performed by processing array 330 will be explained with respect to operations of FIG. 1 as an example for illustration purpose, it will be appreciated that the present disclosure will not be limited to the example illustrated in FIG. 1.

In some embodiments, multiplier 340 can be configured to perform multiplication operations for an assigned work item. For example, first multiplier 340_1 in first layer can perform multiplication operations between first receptive field $b_1$ and first filter 104_1 and second multiplier 340_2 in first layer can perform multiplication operations between second receptive field $b_2$ and first filter 104_1. Similarly, $i^{th}$ multiplier 340_i in first layer can perform multiplication operations between $i^{th}$ receptive field $b_i$ and first filter 104_1.

Accumulator 350 can perform summation operations of multiplication results from multiplier 340 preceding the accumulator 350 in the same processing string. For example, first accumulator 350_1 in first layer can perform summation operations of multiplication results from first multiplier 340_1 and produce first output value $r_1\_c_1$. Second accumulator 350_2 in first layer can perform summation operations of multiplication results from second multiplier 340_2 and produce second output value $r_2\_c_1$. Similarly, $i^{th}$ accumulator 350_i in first layer can perform summation operations of multiplication results from $i^{th}$ multiplier 340_i and produce $i^{th}$ output value $r_i\_c_1$.

According to embodiments of the present disclosure, the other layers of processing array 330 can be similarly configured to perform functions similar to the first layer of processing array 330. Second layer of processing array 330 can also have a plurality of processing strings, each of which includes multiplier 340 and accumulator 350. In some embodiments, processing strings in the second layer of processing array 330 can perform multiplication operations and summation operations with respect to the receptive fields $b_1$ to $b_i$ and second filter 104_2. For example, $i^{th}$ multiplier 340_i of $i^{th}$ processing string in the second layer can be configured to perform multiplication operations between $i^{th}$ receptive field $b_i$ and second filter 104_2. $i^{th}$ accumulator 350_i of $i^{th}$ processing string in the second layer can be configured to perform summation operations of multiplication results from $i^{th}$ multiplier 340_i of $i^{th}$ processing string in the second layer and produce output result value $r_i\_c_2$. Similarly, processing strings in the $K^{th}$ layer of processing array 330 can perform multiplication operations and summation operations with respect to the receptive fields $b_1$ to $b_i$ and $K^{th}$ filter 104_k. For example, $i^{th}$ multiplier 340_i of $i^{th}$ processing string in the $K^{th}$ layer can be configured to perform multiplication operations between $i^{th}$ receptive field $b_i$ and $K^{th}$ filter 104_k. $i^{th}$ accumulator 350_i of $i^{th}$ processing string in the $K^{th}$ layer can be configured to perform summation operations of multiplication results from $i^{th}$ multiplier 340_i of $i^{th}$ processing string in the $K^{th}$ layer and produce output result value $r_i\_c_k$.

In some embodiments, processing array 330 can perform computations under SIMD control. For example, when performing a convolution operation (e.g., illustrated in FIG. 1), each layer of processing array 330 can execute same instructions with different data. In the example illustrated in FIG. 1, first layer of processing array 330 can receive input data corresponding to receptive fields $b_1$ to $b_i$ from first buffer 310 and weight data corresponding to first filter 104_1 from second buffer 320 and perform multiplication and summation computations. Second layer of processing array 330 can receive input data corresponding to receptive fields $b_1$ to $b_i$ and weight data corresponding to second filter 104_2 and perform multiplication and summation computations. Similarly, $K^{th}$ layer of processing array 330 can receive input data corresponding to receptive fields $b_1$ to $b_i$ and weight data corresponding to $K^{th}$ filter 104_k and perform multiplication and summation computations. In this example, each layer of processing array 330 can execute same instructions corresponding to multiplication operations and summation operations with same activation data such as receptive fields $b_1$ to $b_i$ and different weight data such as first filter 104_1 to $K^{th}$ filter 104_k. In some embodiments, K×i number of processing strings are under SIMD control and K×i output values can be generated in parallel.

According to some embodiments of the present disclosure, processing array 330 shown in FIG. 3 can be included in a core (e.g., core 202 in FIG. 2B). When a number of processing strings (e.g., i number of processing strings) included in one layer of processing array 330 is smaller than a number of work items (e.g., B number of work items in FIG. 1), i number of work items can be executed by processing array 330 and subsequently the rest of work items (B-i number of work items) can be executed by the processing array 330 in some embodiments. In some other embodiments, i number of work items can be executed by processing array 330 and the rest of work items can be executed by another processing array 330 in another core.

According to some embodiments of the present disclosure, processing array 330 may further include an element-wise operation processor 360. In some embodiments, element-wise operation processor 360 can be positioned at the end of processing strings. In some embodiments, processing strings in each layer of processing array 330 can share element-wise operation processor 360. For example, i number of processing strings in the first layer of processing array 330 can share element-wise operation processor 360. In some embodiments, element-wise operation processor 360 in the first layer of processing array 330 can perform its element-wise operation on each of output values, from accumulators 350_1 to 350_i, such as $r_1\_c_1$ to $r_i\_c_1$, sequentially. Similarly, element-wise operation processor 360 in the $K^{th}$ layer of processing array 330 can perform its element-wise operation on each of output values, from accumulators 350_1 to 350_i, such as $r_1\_c_k$ to $r_i\_c_k$, sequentially. In some embodiments, element-wise operation processor 360 can be configured to perform a plurality of element-wise operations. In some embodiments, element-wise operation performed by the element-wise operation processor 360 may include an activation function such as ReLU function, Leaky ReLU function, Sigmoid function, Tan h function, or the like.

In some embodiments, multiplier 340 or accumulator 350 may be configured to perform its operation on different data type from what the element-wise operation processor 360 performs its operations on. For example, multiplier 340 or accumulator 350 can be configured to perform its operations on integer type data such as Int 8, Int 16, and the like and element-wise operation processor 360 can perform its operations on floating point type data such as FP24, and the like. Therefore, according to some embodiments of the present disclosure, processing array 330 may further include de-quantizer 370 and quantizer 380 with element-wise operation processor 360 positioned therebetween. In some embodiments, batch normalization operations can be merged to de-quantizer 370 because both de-quantizer 370 and batch normalization operations can be performed by multiplication operations and addition operations with constants, which can be provided from constant buffer 2030. In some embodiments, batch normalization operations and de-quantization operations can be merged into one operation by compiler. As shown in FIG. 3, constant buffer 2030 can provide constants to de-quantizer 370 for de-quantization or batch normalization.

Figure 4:
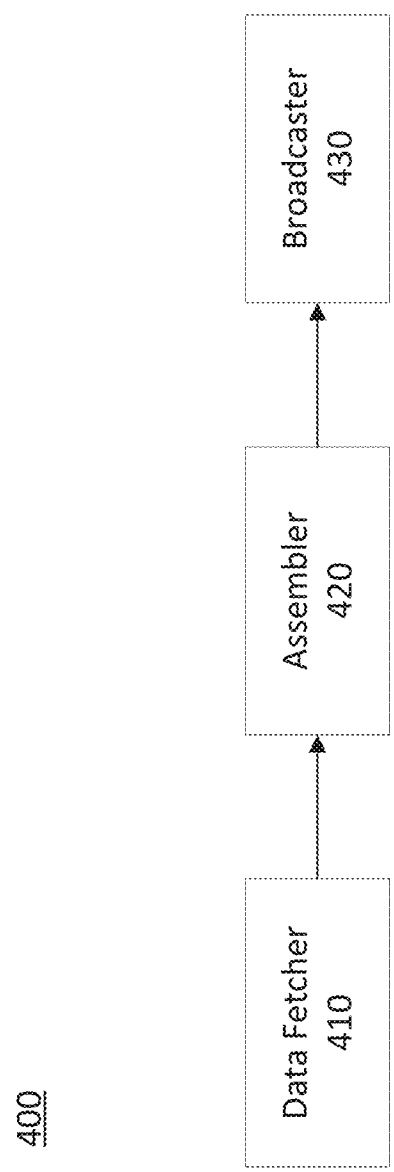
FIG. 4 illustrates a block diagram of an exemplary controller, consistent with embodiments of the present disclosure.

FIG. 4 illustrates a block diagram of exemplary controller, consistent with embodiments of the present disclosure. As discussed by referring to FIG. 1 and FIG. 3, when computing CNN operations, receptive fields (such as field $b_1$) can partially overlap with neighboring receptive fields (such as fields $b_2$ to $b_3$). According to embodiments of the present disclosure, controller 400 can be configured to support data reuse and share scheme, which can be suitable for performing CNN operations. In some embodiments, controller 400 may be part of or may be separate from operation unit 2020. In some embodiments, controller 400 may be a part of memory engine 2024. In some embodiments, controller 400 may be part of or may be separate from a first buffer 310.

As shown in FIG. 4, controller 400 may include a data fetcher 410, an assembler 420, and a broadcaster 430. Data fetcher 410 can be configured to fetch data into first buffer 310 of FIG. 3. In some embodiments, data may be fetched from local memory 2032 to first buffer 310. Assembler 420 can be configured to regroup the fetched data by data fetcher 410 for forming multiple work items from the data. For example, assembler 420 can regroup data stored in first buffer 310 to form multiple receptive fields $b_1$, $b_2$, etc. Broadcaster 430 can be configured to broadcast the work items formed by the assembler 420 to corresponding processing strings included in processing array 330 shown in FIG. 3. Examples of data fetcher 410, assembler 420, and broadcaster 430 are further explained by referring to FIG. 5, FIG. 6A, FIG. 6B, and FIG. 6C in detail.

Figure 5:
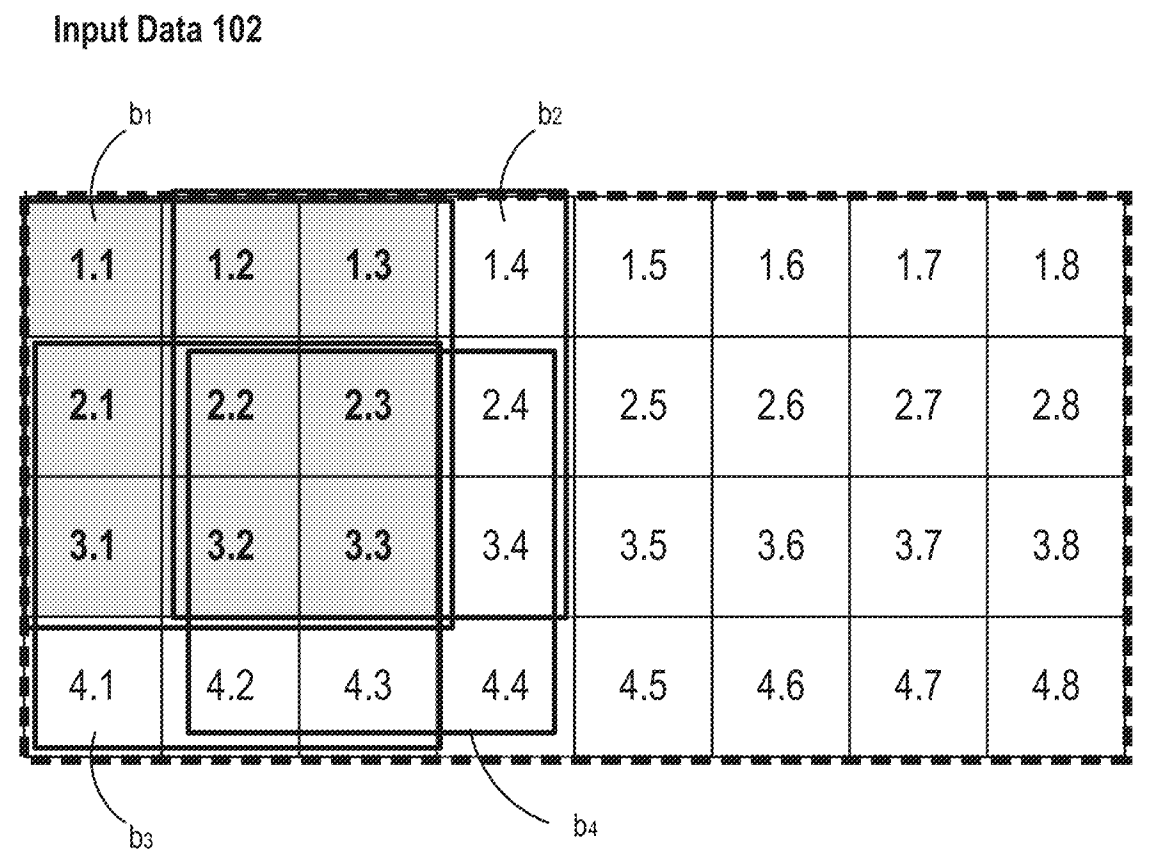

FIG. 5 illustrates an example of input data to be used for a convolution operation. Input data shown in FIG. 5 can be a part of input data 102 in FIG. 1 to be used for a convolution operation and FIG. 5 illustrates a first channel of input data only for simplicity and illustration purposes. As shown in FIG. 5, input data 102 can comprise a plurality of activation values. In some embodiments, each activation value can be represented by a pixel of input data 102. In some embodiments, a plurality of activation values can be represented as a plurality of pixels arranged in a matrix.

In FIG. 5, input data is illustrated as a matrix having 4 rows and 8 columns. In the present disclosure, embodiments where a convolution operation is performed with a window size 3×3 and a stride of 1 pixel will be explained for illustration purpose only. For example, first receptive field $b_1$ has C number of channels and each channel covers 9 pixels 1.1 to 3.3 bound by first row and third row and first column and third column. In FIG. 5, pixels 1.1 to 3.3 covered by first receptive field $b_1$ is shaded for illustration purposes. In this example, second receptive field $b_2$ is defined by moving a 3×3 window by 1 pixel from the first receptive field $b_1$ in a row direction. Other receptive fields can be defined by sliding a 3×3 window on the input data 102 by 1 pixel from a neighboring receptive field in a row direction or in a column direction. For example, second receptive field $b_2$ has C number of channels and each channel covers 9 pixels bound by first row and third row and second column and fourth column. Third receptive field $b_3$ can cover 9 pixels bound by second row and fourth row and first column and third column. Fourth receptive field $b_4$ can cover 9 pixels bound by second row and fourth row and second column and fourth column.

As shown in FIG. 5, first receptive field $b_1$ and other receptive fields (e.g., $b_2$ to $b_4$) partially overlap. For example, first receptive field $b_1$ and second receptive field $b_2$ share 6 pixels 1.2, 1.3, 2.2, 2.3, 3.2, and 3.3 and first receptive field $b_1$ and third receptive field $b_3$ share 6 pixels 2.1, 2.2, 2.3, 3.1, 3.2, and 3.3. Also, first receptive field $b_1$ and fourth receptive field $b_4$ share 4 pixels 2.2, 2.3, 3.2, and 3.3. If each receptive field $b_1$ to $b_4$ is fetched into buffer for the convolution operation as in the conventional technology, data for overlapped pixels will be repetitively fetched, which causes available bandwidth decrease, buffer space deficiency, and execution delay.

Figure 6A:
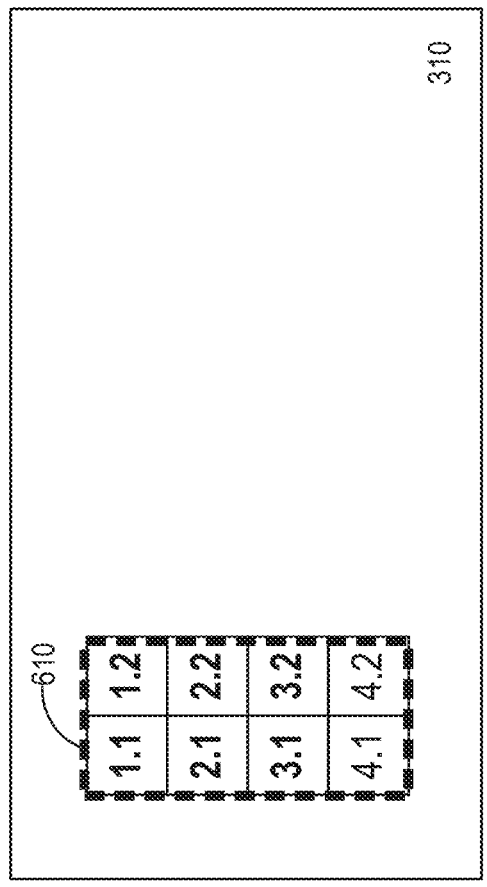
FIG. 6A illustrates an example of data fetch in a first time period, consistent with embodiments of the present disclosure.

Reference is now made to FIG. 6A illustrating an example of data fetched and stored in first buffer 310 at a first time period T1. In some embodiments, data fetcher 410 of FIG. 4 can be configured to fetch a batch of data from local memory 2032. In this example, a first batch of data corresponding to 4×2 size of pixels can be fetched at one cycle. For example, a first batch of data 610 corresponding to pixels 1.1, 1.2, 2.1, 2.2, 3.1, 3.2, 4.1, and 4.2 can be fetched from input data 102 stored in local memory 2032 shown in FIG. 5. While data fetcher 410 can fetch any amount or shape of data at one or multiple cycles according to available bandwidth or system requirements, embodiments where 4×2 size of data is fetched at one cycle will be explained in the present disclosure.

At first time period T1, the data stored in first buffer 310 does not cover a 3×3 widow size, assembler 420 does not start regrouping of work items. According to embodiments of the present disclosure, assembler 420 can traverse data fetched and stored in first buffer 310 to determine whether the data stored in first buffer 310 covers at least one window size, e.g., 3×3 size in this example. When a size of data fetched by data fetcher 410 at one cycle is smaller than the window size, e.g., 3×3 size, assembler 420 may wait until the size of data stored in first buffer 310 becomes equal to or bigger than the size of the window size. In this example, assembler 420 may start assembling work items after a first batch of data 610 and a second batch of data 620 (as illustrated in FIG. 6B) are fetched from local memory 2032.

Figure 6B:
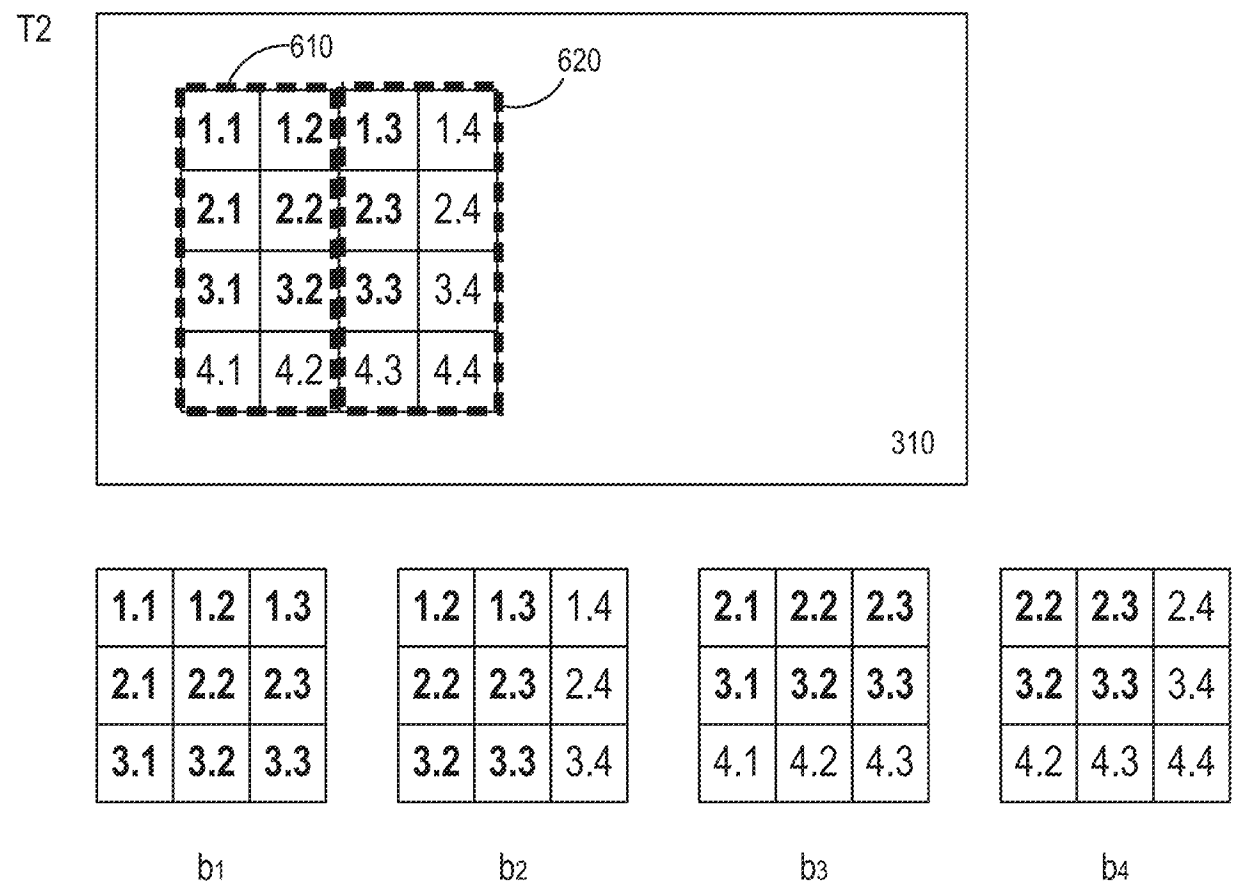

FIG. 6B illustrates an example of data fetch and assembly in a second time period, consistent with embodiments of the present disclosure. In a second time period T2, data fetcher 410 can fetch a second batch of data 620 corresponding to pixels 1.3, 1.4, 2.3, 2.4, 3.3, 3.4, 4.3, and 4.4 from input data 102 stored in local memory 2032 shown in FIG. 5. Because data including first batch of data 610 and second batch of data 620 stored in first buffer 310 can cover a window size, assembler 420 can start forming multiple work items from the data stored in first buffer 310. For example, assembler 420 can regroup data stored in first buffer 310 to form four receptive fields $b_1$ to $b_4$. It is noted that four receptive fields of 3×3 size can be assembled from 4×4 size data stored in first buffer 310 without the need of fetching shared data repeatedly in this example. In FIG. 6B, four work items, e.g., receptive fields $b_1$ to $b_4$ as illustrated in FIG. 5, can be assembled from 4×4 size input data stored in first buffer 310.

According to some embodiments of the present disclosure, broadcaster 430 can transfer work items formed by assembler 410 to corresponding processing elements (e.g., processing array 330 illustrated in FIG. 3). In some embodiments, broadcaster 430 can transfer work items to each layer of processing array 330. For example, broadcaster 430 may transfer first receptive field $b_1$ to first multiplier 340_1 of first to $K^{th}$ channels of processing array 330 and second receptive field $b_2$ to second multiplier 340_2 of first to $K^{th}$ channels of processing array 330. Similarly, broadcaster 430 may transfer $3^{rd}$ and $4^{th}$ receptive fields $b_3$ and $b_4$ to $3^{rd}$ and $4^{th}$ multipliers 340_3 and 340_4 of first to $K^{th}$ channels of processing array 330.

Figure 6C:
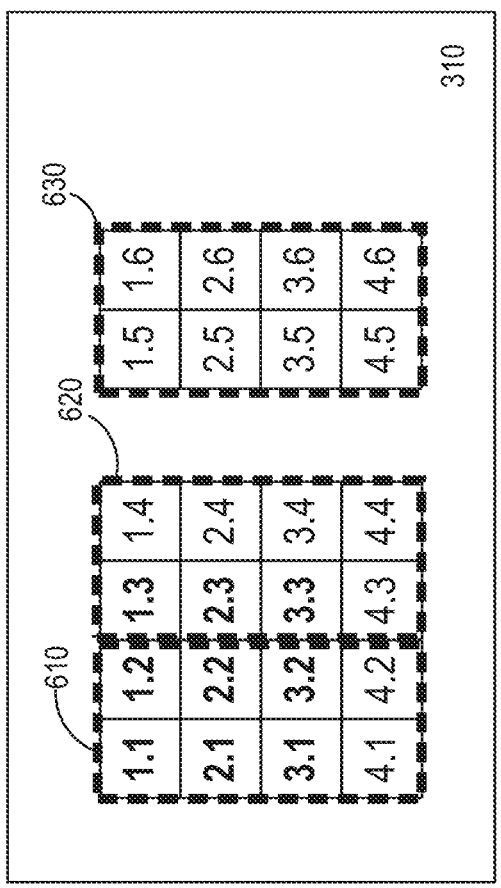
FIG. 6C illustrates an example of data fetch and assembly in a third time period, consistent with embodiments of the present disclosure.

FIG. 6C illustrates an example of data fetch and assembly in a third time period, consistent with embodiments of the present disclosure. In a third time period T3, data fetcher 410 can fetch a third batch of data 630 corresponding to pixels from 1.5, 1.6, 2.5, 2.6, 3.5, 3.6, 4.5, and 4.6 can be fetched from input data 102 stored in local memory 2032 shown in FIG. 5. Assembler 420 can form work items such as receptive fields $b_5$ to $b_8$ from second batch of data 620 and third batch of data 630 by traversing the data stored in first buffer 310 similarly to the process in the second time period T2. It is noted that four receptive fields $b_5$ to $b_8$ of 3×3 size can be assembled from 4×4 size data stored in first buffer 310 in this example.

Here, because first batch of data 610 is not used for forming work items anymore, first batch of data 610 may be deallocated or may be determined to be deallocated from first buffer 310. According to some embodiments of the present disclosure, deallocating data from first buffer 310 may include deleting the data from first buffer 310. If first batch of data 610 is to be used in the later time period, the first batch of data 610 may be maintained in the first buffer 310. Data, which is not used by assembler 420 anymore, may be maintained in the first buffer 310 for a predetermined time period in case for reuse in the near future in order to prevent extra data transfer between local memory 2032 and first buffer 310 according to some embodiments of the present disclosure. It is also noted that, in third time period T3, the second batch of data 620 is reused to form new work items without fetching the second batch of data 620 again.

In third time period T3, broadcaster 430 can also transfer work items newly formed by assembler 410 to corresponding processing elements (e.g., processing array 330 illustrated in FIG. 3). For example, broadcaster 430 may transfer fifth receptive field $b_5$ to fifth multiplier 340_5 of each of first to $K^{th}$ channels of processing array 330 and sixth receptive field $b_6$ to sixth multiplier 340_6 of each of first to $K^{th}$ channels of processing array 330. Similarly, broadcaster 430 may transfer $7^{th}$ and $8^{th}$ receptive fields $b_7$ and $b_8$ to $7^{th}$ and $8^{th}$ multipliers 340_7 and 340_8 of each of first to $K^{th}$ channels of processing array 330.

In subsequent time periods, a batch of data with 4×2 size can be fetched and 4 work items with 3×3 size can be formed according to embodiments of the present disclosure. As discussed above, according to embodiments of the present disclosure, with a relatively small amount of data fetch from local memory 2032 to first buffer 310, relatively large amount of work items can be assembled. Therefore, resources on first buffer 310 can be saved and, in some embodiments, first buffer 310 size can be reduced. Data fetch requirements can be met with relatively small bandwidth than in the conventional technique because of data reuse and share schemes according to some embodiments of the present disclosure.

According to embodiments of the present disclosure, highly efficient work items assembling and processing techniques for neural network inference can be obtained. Embodiments of the present disclosure can provide a data reuse and share scheme among work items to be used for CNN operation. Embodiments of the present disclosure can provide an accelerator architecture that enables efficient processing of CNN operation based on data repetition characteristics among work items. Embodiments of the present disclosure enables bandwidth usage reduction for data fetch and system throughput improvement. Embodiments of the present disclosure also enables efficient resource usage with respect to bandwidth and buffer space. Embodiments of the present disclosure also prevent repetitive data transfer between local memory and buffer memory.

Figure 7:
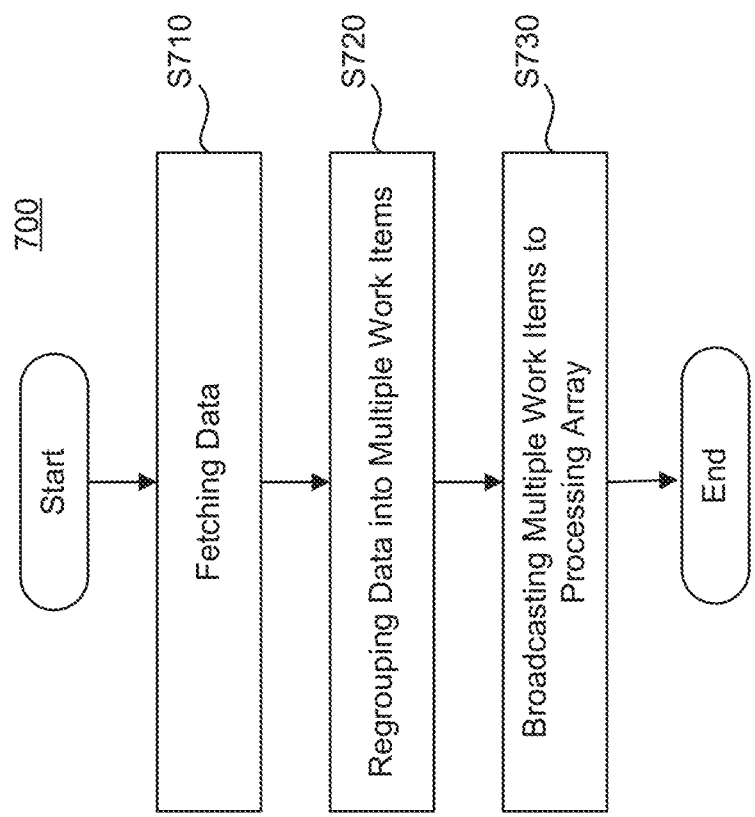
FIG. 7 illustrates an exemplary flow diagram for executing a convolutional neural network operation, consistent with embodiments of the present disclosure.

FIG. 7 illustrates an exemplary flow diagram for executing a convolutional neural network operation, consistent with embodiments of the present disclosure. For illustrative purposes, a method for executing a convolutional neural network operation illustrated in FIG. 1 will be described referring to FIG. 4, FIG. 5, FIG. 6A, FIG. 6B, and FIG. 6C. In the present disclosure, embodiments where a convolution operation is performed with a window size 3×3 and a stride of 1 pixel will be explained for illustration purposes.

At step S710, data can be fetched into a buffer memory. Step S710 can be performed by, for example, data fetcher 410, among others. In some embodiments, data may be fetched from local memory 2032 to first buffer 310. An example of data to be fetched to first buffer 310 is illustrated in FIG. 5. In some embodiments, a batch of data can be fetched from local memory 2032 to first buffer 310. In this example, a first batch of data corresponding to 4×2 size of pixels can be fetched at one cycle, as illustrated at first time period T1 in FIG. 6A. While any amount or shape of data can be fetched at one or multiple cycles according to available bandwidth or system requirements, embodiments where 4×2 size of data is fetched at one cycle will be explained in the present disclosure.

As illustrated at first time period T1 in FIG. 6A, when the data stored in first buffer 310 does not cover a 3×3 widow size, regrouping of data may not be started. According to embodiments of the present disclosure, data fetched and stored in first buffer 310 can be traversed to determine whether the data stored in first buffer 310 covers at least one window size, e.g., 3×3 size in this example. In some embodiments, regrouping of data may not be performed until the size of data stored in first buffer 310 becomes equal to or bigger than the size of the window size.

When a size of data fetched to a buffer memory at one cycle is smaller than the window size, e.g., 3×3 size, as illustrated at time period T2 in FIG. 6B, a second batch of data 620 can be fetched from local memory 2032 to first buffer 310. Because data including first batch of data 610 and second batch of data 620 stored in first buffer 310 cover a window size, the method can proceed to step S720. At step S720, regrouping the fetched data can be performed to forming multiple work items from the fetched data. Step S720 can be performed by, for example, assembler 420, among others. For example, at step S720, data stored in first buffer 310 may be regrouped to form four receptive fields $b_1$ to $b_4$. It is noted that four receptive fields of 3×3 size can be assembled from 4×4 size data stored in first buffer 310 without the need of fetching shared data repeatedly in this example. In FIG. 6B, four work items, e.g., receptive fields $b_1$ to $b_4$ as illustrated in FIG. 5, can be assembled from 4×4 size input data stored in first buffer 310.

At step S730, work items formed at step S720 can be broadcasted to corresponding processing elements (e.g., processing array 330 illustrated in FIG. 3). Step S730 can be performed by, for example, broadcaster 430, among others. In some embodiments, work items formed at step S720 can be transferred to each layer of processing array 330. For example, first receptive field $b_1$ can be transferred to first multiplier 340_1 of first to $K^{th}$ channels of processing array 330 and second receptive field $b_2$ can be transferred to second multiplier 340_2 of first to $K^{th}$ channels of processing array 330. Similarly, $3^{rd}$ and $4^{th}$ receptive fields $b_3$ and $b_4$ can be transferred to $3^{rd}$ and $4^{th}$ multipliers 340_3 and 340_4 of first to $K^{th}$ channels of processing array 330.

As shown in FIG. 6C, steps S710, S720, and S730 can be repeated during execution of a convolutional operation. For example, a third batch of data 630 can be fetched from input data 102 stored in local memory 2032 as illustrated at third time period T3 in FIG. 6C. Work items such as receptive fields $b_5$ to $b_8$ from second batch of data 620 and third batch of data 630 can be formed after traversing the data stored in first buffer 310 similarly to the process in the second time period T2. It is noted that four receptive fields $b_5$ to $b_8$ of 3×3 size can be assembled from 4×4 size data stored in first buffer 310 in this example.

Here, because first batch of data 610 is not used for forming work items anymore, the method may further include a step for deallocating or determining to deallocate the first batch of data 610 from first buffer 310. If first batch of data 610 is to be used in the later time period, the first batch of data 610 may be maintained in the first buffer 310. Data, which is not used for regrouping anymore, may be maintained in the first buffer 310 for a predetermined time period in case for reuse in the near future in order to prevent extra data transfer between local memory 2032 and first buffer 310 according to some embodiments of the present disclosure. It is also noted that, in third time period T3, the second batch of data 620 is reused to form new work items without fetching the second batch of data 620 again.

In third time period T3, work items newly formed can be transferred to corresponding processing elements (e.g., processing array 330 illustrated in FIG. 3). For example, fifth receptive field $b_5$ can be transferred to fifth multiplier 340_5 of each of first to $K^{th}$ channels of processing array 330 and sixth receptive field $b_6$ can be transferred to sixth multiplier 340_6 of each of first to $K^{th}$ channels of processing array 330. Similarly, $7^{th}$ and $8^{th}$ receptive fields $b_7$ and $b_8$ can be transferred to $7^{th}$ and $8^{th}$ multipliers 340_7 and 340_8 of each of first to $K^{th}$ channels of processing array 330.

In subsequent time periods, steps S710, S720, and S730 can also be repeated during execution of a convolutional operation. For example, a batch of data with 4×2 size can be fetched and 4 work items with 3×3 size can be formed according to embodiments of the present disclosure in each time period. Work items newly formed can also be transferred to corresponding processing strings.

The embodiments may further be described using the following clauses:

1. A device for executing a convolutional neural network operation, comprising:
   a first memory;
   a processing array comprising a plurality of processing strings; and
   a controller configured to:
   fetch one or more batches of data into the first memory;
   regroup the one or more batches of data into multiple work items, wherein a first work item partially overlaps one or more work items among the multiple work items; and
   broadcast the multiple work items to the processing array, wherein the first work item is transferred to two or more processing strings of the processing array.

2. The device of clause 1, wherein the plurality of processing strings are classified into a plurality of subsets and the first work item is transferred to a first processing string in each of the plurality of subsets.

3. The device of clause 2, further comprising a second memory storing a plurality of filters of which number corresponds to a number of the subsets.

4. The device of any one of clauses 1 to 3, wherein each of the processing strings includes a multiplier and an accumulator.

5. The device of clause 3, wherein each of the processing strings includes a multiplier and an accumulator, and
   wherein the processing array includes an element-wise operation processor in each of the plurality of subsets.

6. The device of any one of clauses 1 to 5, wherein the controller is further configured to:
   traverse the one or more batches of data in the first memory to determine a size of the one or more batches of data covers a predetermined data size corresponding to a size of each of the multiple work items.

7. The device of clause 6, wherein the controller is further configured to:
   fetch an additional batch of data into the first memory when the size of the one or more batches of data is determined not to cover a predetermined data size corresponding to the size of each of the multiple work items.

8. The device of any one of clauses 1 to 7, wherein the controller is further configured to:
   deallocate a portion of the one or more batches of data when the portion of the one or more batches of data is determined not to be used in a predetermined time period.

9. The device of any one of clauses 1 to 5, wherein each of the multiple work items has a first data size, the one or more batches of data has a plurality of channels, and each channel has a second data size covering the first data size.

10. A method for executing a convolutional neural network operation, comprising:
    fetching one or more batches of data in a first memory;
    regrouping the one or more batches of data into multiple work items, wherein a first work item partially overlaps one or more work items among the multiple work items; and
    broadcasting the multiple work items to a processing array comprising a plurality of processing strings, wherein the first work item is transferred to two or more processing strings of the processing array.

11. The method of clause 10, wherein the plurality of processing strings are classified into a plurality of subsets and the first work item is transferred to a first processing string in each of the plurality of subsets.

12. The method of clause 11, further comprising:
    transferring a plurality of filters to the processing array,
    wherein a number of the plurality of filters corresponds to a number of the plurality of subsets and each of the plurality of filter is transferred to a corresponding subset among the plurality of subsets.

13. The method of any one of clauses 10 to 12, further comprising:
    performing a multiplication operation on the first work item in the two or more processing strings in parallel.

14. The method of clause 13, further comprising:

performing an addition operation on multiplication results in the two or more processing strings in parallel.

15. The method of any one of clauses 10 to 14, further comprising:

traversing the one or more batches of data in the first memory to determine a size of the one or more batches of data covers a predetermined data size corresponding to a size of each of the multiple work items.

16. The method of clause 15, further comprising:

fetching an additional batch of data into the first memory when the size of the one or more batches of data is determined not to cover a predetermined data size corresponding to the size of each of the multiple work items.

17. The method of any one of clauses 10 to 16, further comprising:

deallocating a portion of the one or more batches of data when the portion of the one or more batches of data is determined not to be used in a predetermined time period 18. The method of any one of clauses 10 to 17, further comprising:

generating a plurality of outputs by the plurality of processing strings in parallel.

19. A non-transitory computer readable storage medium storing a set of instructions that are executable by at least one processor of a computing device to cause the computing device to perform a method for executing a convolutional neural network operation, the method comprising:

fetching one or more batches of data in a first memory;

regrouping the one or more batches of data into multiple work items, wherein a first work item partially overlaps one or more work items among the multiple work items; and broadcasting the multiple work items to a processing array comprising a plurality of processing strings, wherein the first work item is transferred to two or more processing strings of the processing array.

20. The computer readable storage medium of clause 19, wherein the plurality of processing strings are classified into a plurality of subsets and the first work item is transferred to a first processing string in each of the plurality of subsets.

21. The computer readable storage medium of clause 20, wherein the set of instructions that are executable by at least one processor of the computing device to cause the computing device to further perform:

transferring a plurality of filters to the processing array, wherein a number of the plurality of filters corresponds to a number of the plurality of subsets and each of the plurality of filter is transferred to a corresponding subset among the plurality of subsets.

22. The computer readable storage medium of any one of clauses 19 to 21, wherein the set of instructions that are executable by at least one processor of the computing device to cause the computing device to further perform:

performing a multiplication operation on the first work item in the two or more processing strings in parallel.

23. The computer readable storage medium of clause 22, wherein the set of instructions that are executable by at least one processor of the computing device to cause the computing device to further perform:

performing an addition operation on multiplication results in the two or more processing strings in parallel.

24. The computer readable storage medium of any one of clauses 19 to 23, wherein the set of instructions that are executable by at least one processor of the computing device to cause the computing device to further perform:

traversing the one or more batches of data in the first memory to determine a size of the one or more batches of data covers a predetermined data size corresponding to a size of each of the multiple work items.

25. The computer readable storage medium of clause 24, wherein the set of instructions that are executable by at least one processor of the computing device to cause the computing device to further perform:

fetching an additional batch of data into the first memory when the size of the one or more batches of data is determined not to cover a predetermined data size corresponding to the size of each of the multiple work items.

26. The computer readable storage medium of any one of clauses 19 to 25, wherein the set of instructions that are executable by at least one processor of the computing device to cause the computing device to further perform:

deallocating a portion of the one or more batches of data when the portion of the one or more batches of data is determined not to be used in a predetermined time period.

27. The computer readable storage medium of any one of clauses 19 to 26, wherein the set of instructions that are executable by at least one processor of the computing device to cause the computing device to further perform:

generating a plurality of outputs by the plurality of processing strings in parallel.

28. A terminal, comprising:

a host unit; and a device for executing a convolutional neural network operation communicatively coupled to the host unit, the device comprising:

a first memory;

a processing array comprising a plurality of processing strings; and a controller configured to:

fetch one or more batches of data into the first memory;

regroup the one or more batches of data into multiple work items, wherein a first work item partially overlaps one or more work items among the multiple work items; and broadcast the multiple work items to the processing array, wherein the first work item is transferred to two or more processing strings of the processing array.

Embodiments herein include database systems, methods, and tangible non-transitory computer-readable media. The methods may be executed, for example, by at least one processor that receives instructions from a tangible non-transitory computer-readable storage medium (such as of a host system having host unit 220 and host memory 221 of FIG. 2A). Similarly, systems consistent with the present disclosure may include at least one processor and memory, and the memory may be a tangible non-transitory computer-readable storage medium. As used herein, a tangible non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, registers, caches, and any other known physical storage medium. Singular terms, such as "memory" and "computer-readable storage medium," may additionally refer to multiple structures, such a plurality of memories or computer-readable storage media. As referred to herein, a "memory" may comprise any type of computer-readable storage medium unless otherwise specified. A computer-readable storage medium may store instructions for execution by at least one processor, including instructions for causing the processor to perform steps or stages consistent with embodiments herein. Additionally, one or more computer-readable storage media may be utilized in implementing a computer-implemented method. The term "non-transitory computer-readable storage medium" should be understood to include tangible items and exclude carrier waves and transient signals.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A device for executing a convolutional neural network operation, comprising:
   a first memory;
   a processing array comprising a plurality of processing strings; and
   a controller configured to:
   fetch one or more batches of data into the first memory;
   regroup the fetched one or more batches of data into multiple work items, wherein a first work item partially overlaps one or more work items among the multiple work items;
   broadcast the multiple work items to the processing array, wherein the first work item is transferred to two or more processing strings of the processing array; and
   deallocate a portion of the one or more batches of data when the portion of the one or more batches of data is determined not to be used in a predetermined time period.

2. The device of claim 1, wherein the plurality of processing strings are classified into a plurality of subsets and the first work item is transferred to a first processing string in each of the plurality of subsets.

3. The device of claim 2, further comprising a second memory storing a plurality of filters of which number corresponds to a number of the subsets.

4. The device of claim 1, wherein each of the processing strings includes a multiplier and an accumulator.

5. The device of claim 3, wherein each of the processing strings includes a multiplier and an accumulator, and wherein the processing array includes an element-wise operation processor in each of the plurality of subsets.

6. The device of claim 1, wherein the controller is further configured to:
   traverse the one or more batches of data in the first memory to determine a size of the one or more batches of data covers a predetermined data size corresponding to a size of each of the multiple work items.

7. The device of claim 6, wherein the controller is further configured to:
   fetch an additional batch of data into the first memory when the size of the one or more batches of data is determined not to cover a predetermined data size corresponding to the size of each of the multiple work items.

8. The device of claim 1, wherein each of the multiple work items has a first data size, the one or more batches of data has a plurality of channels, and each channel has a second data size covering the first data size.

9. A method for executing a convolutional neural network operation, comprising:
   fetching one or more batches of data in a first memory;
   regrouping the fetched one or more batches of data into multiple work items, wherein a first work item partially overlaps one or more work items among the multiple work items;
   broadcasting the multiple work items to a processing array comprising a plurality of processing strings, wherein the first work item is transferred to two or more processing strings of the processing array; and
   deallocating a portion of the one or more batches of data when the portion of the one or more batches of data is determined not to be used in a predetermined time period.

10. The method of claim 9, wherein the plurality of processing strings are classified into a plurality of subsets and the first work item is transferred to a first processing string in each of the plurality of subsets.

11. The method of claim 10, further comprising:
    transferring a plurality of filters to the processing array, wherein a number of the plurality of filters corresponds to a number of the plurality of subsets and each of the plurality of filter is transferred to a corresponding subset among the plurality of subsets.

12. The method of claim 9, further comprising:
    performing a multiplication operation on the first work item in the two or more processing strings in parallel.

13. The method of claim 12, further comprising:
    performing an addition operation on multiplication results in the two or more processing strings in parallel.

14. The method of claim 9, further comprising:
    traversing the one or more batches of data in the first memory to determine a size of the one or more batches of data covers a predetermined data size corresponding to a size of each of the multiple work items.

15. The method of claim 14, further comprising:
    fetching an additional batch of data into the first memory when the size of the one or more batches of data is determined not to cover a predetermined data size corresponding to the size of each of the multiple work items.

16. The method of claim 9, further comprising:
    generating a plurality of outputs by the plurality of processing strings in parallel.

17. A non-transitory computer readable storage medium storing a set of instructions that are executable by at least one processor of a computing device to cause the computing device to perform a method for executing a convolutional neural network operation, the method comprising:
    fetching one or more batches of data in a first memory;
    regrouping the fetched one or more batches of data into multiple work items, wherein a first work item partially overlaps one or more work items among the multiple work items;

broadcasting the multiple work items to a processing array comprising a plurality of processing strings, wherein the first work item is transferred to two or more processing strings of the processing array; and deallocating a portion of the one or more batches of data when the portion of the one or more batches of data is determined not to be used in a predetermined time period.

18. The computer readable storage medium of claim 17, wherein the plurality of processing strings are classified into a plurality of subsets and the first work item is transferred to a first processing string in each of the plurality of subsets.

19. The computer readable storage medium of claim 18, wherein the set of instructions that are executable by at least one processor of the computing device to cause the computing device to further perform:

transferring a plurality of filters to the processing array, wherein a number of the plurality of filters corresponds to a number of the plurality of subsets and each of the plurality of filter is transferred to a corresponding subset among the plurality of subsets.

20. The computer readable storage medium of claim 17, wherein the set of instructions that are executable by at least one processor of the computing device to cause the computing device to further perform:

performing a multiplication operation on the first work item in the two or more processing strings in parallel.

21. The computer readable storage medium of claim 20, wherein the set of instructions that are executable by at least one processor of the computing device to cause the computing device to further perform:

performing an addition operation on multiplication results in the two or more processing strings in parallel.

22. The computer readable storage medium of claim 17, wherein the set of instructions that are executable by at least one processor of the computing device to cause the computing device to further perform:

traversing the one or more batches of data in the first memory to determine a size of the one or more batches of data covers a predetermined data size corresponding to a size of each of the multiple work items.

23. The computer readable storage medium of claim 22, wherein the set of instructions that are executable by at least one processor of the computing device to cause the computing device to further perform:

fetching an additional batch of data into the first memory when the size of the one or more batches of data is determined not to cover a predetermined data size corresponding to the size of each of the multiple work items.

24. The computer readable storage medium of claim 17, wherein the set of instructions that are executable by at least one processor of the computing device to cause the computing device to further perform:

generating a plurality of outputs by the plurality of processing strings in parallel.

25. A terminal, comprising:
a host unit; and
a device for executing a convolutional neural network operation communicatively coupled to the host unit, the device comprising:
a first memory;
a processing array comprising a plurality of processing strings; and
a controller configured to:
fetch one or more batches of data into the first memory;
regroup the fetched one or more batches of data into multiple work items, wherein a first work item partially overlaps one or more work items among the multiple work items;
broadcast the multiple work items to the processing array, wherein the first work item is transferred to two or more processing strings of the processing array; and
deallocate a portion of the one or more batches of data when the portion of the one or more batches of data is determined not to be used in a predetermined time period.

* * * * *